AUTOMATIC FUSING PRESS FOR FABRICS
Filed Jan. 20, 1970 3 Sheets-Sheet 1
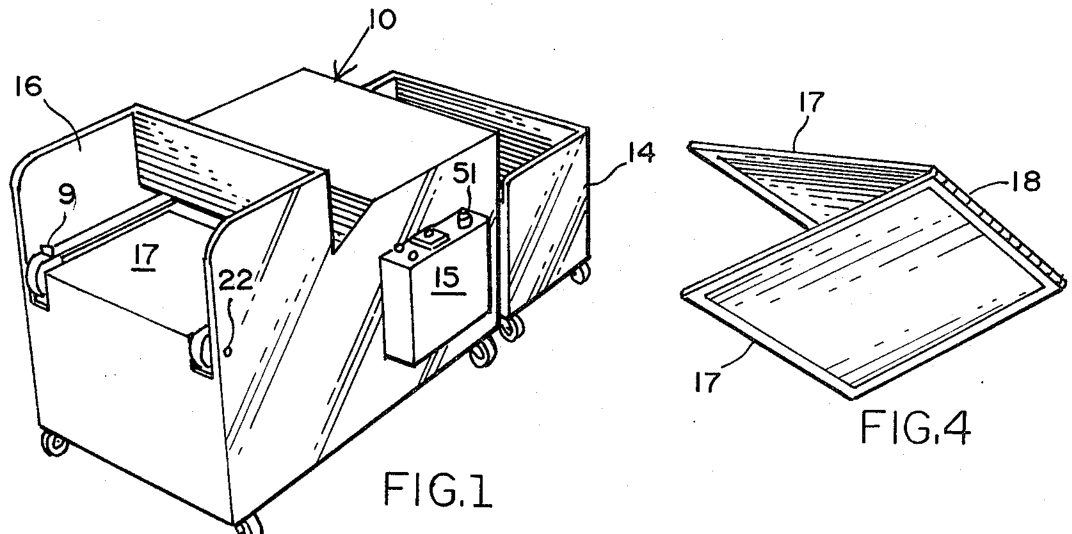
FIG.1
FIG.4
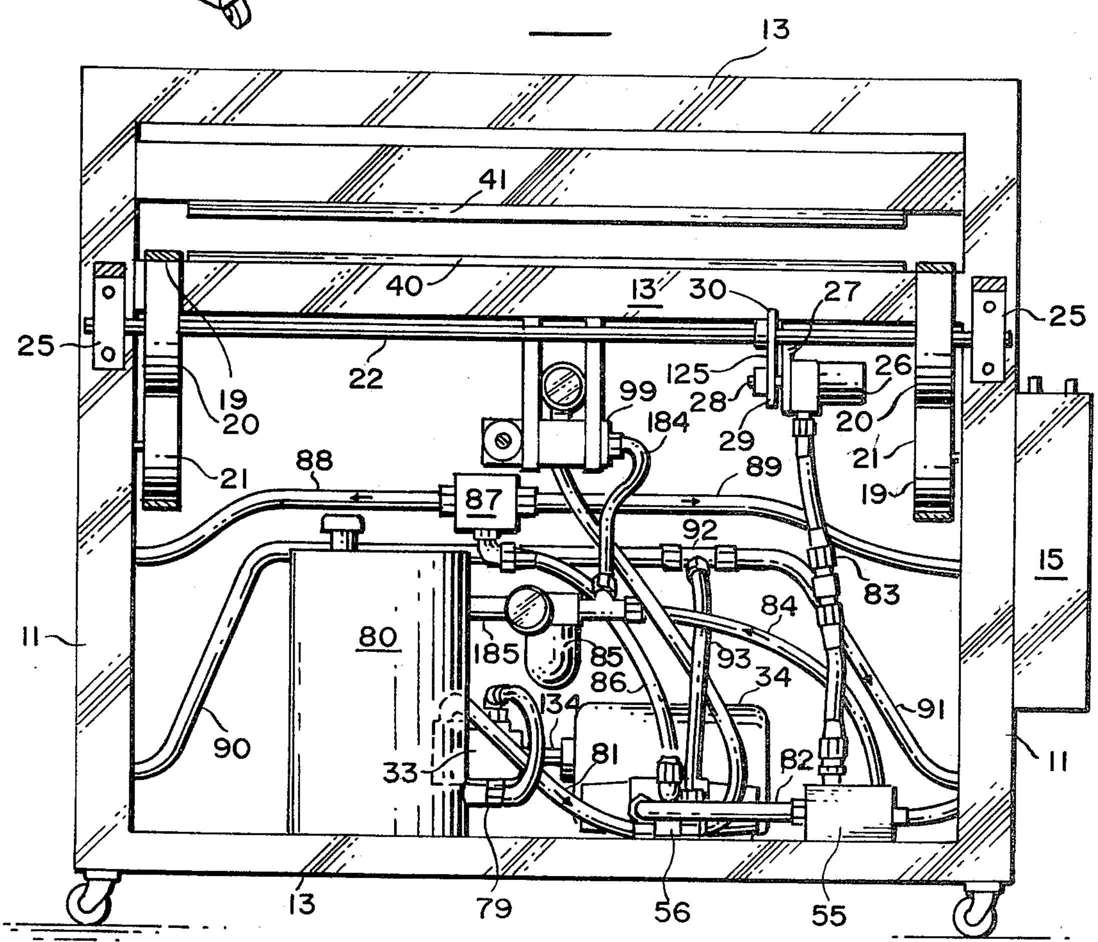
FIG.3
INVENTORS
RICHARD MILITANA
ROBERT R.SPINELLI
BY
Salvatore G. Militana
ATTORNEY INVENTORS
RICHARD MILITANA
ROBERT R. SPINELLI
BY
Salvatore G. Militana
ATTORNEY INVENTORS
RICHARD MILITANA
ROBERT R. SPINELLI
BY
Salvatore G. Militana
ATTORNEY 3,598,684

AUTOMATIC FUSING PRESS FOR FABRICS

Richard Militana, 7500 Miami View Drive, North Bay Island, Miami Beach, Fla. 33141, and Robert R. Spinelli, 1350 NE. 143rd St., North Miami, Fla. 33161

Filed Jan. 20, 1970, Ser. No. 4,214
Int. Cl. B30b *15/02;* B65h *5/02, 7/04*
U.S. Cl. 156—573 3 Claims

ABSTRACT OF THE DISCLOSURE

A fusing press for fabrics having a feeder bin at one end and a collection bin at the other end with an endless belt and pulley system for carrying trays having fabrics to be processed thereon from the feeder bins through the apparatus for processing and into the collection bin. Positioned between the feeder bin and collection bin is a hydraulically operated press with heating elements contained therein for subjecting the fabrics in the trays to desired temperatures and pressures with timer means controlling the various operations as long as trays are positioned on the feeder bin.

This invention relates to a press for fusing fabrics and is more particularly directed to an automatic machine for fusing fabrics together in lieu of sewing fabrics in the production of clothing.

A principal object of the present invention is to provide a fusing press for fabrics with a feeding bin for receiving a stack of trays in which the fabrics to be fused are placed whereby the press may be operated continuously and at a maximum efficiency.

Another object of the present invention is to provide a fusing press for fabrics which is automatic in operation requiring only one person to place the trays in the feed bin and remove them from the collection bin during which time the press is in continuous operation.

A further object of the present invention is to provide a fusing press for fabrics which utilizes a hydraulic system for operating the press and the conveyors.

A still further object of the present invention is to provide a fusing press for fabrics which is simple in design, inexpensive in cost of manufacture as well as being simple in operation with the cost of operation being minimal.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

FIG. 1 is a perspective view of a machine constructed in accordance with our invention for the automatic fusing together of fabrics.

FIG. 3 is a cross sectional view taken along the line 3—3 of FIG. 2.

FIG. 4 is a perspective view of a pair of hinged cloth receiving panels or trays.

Figure 2:
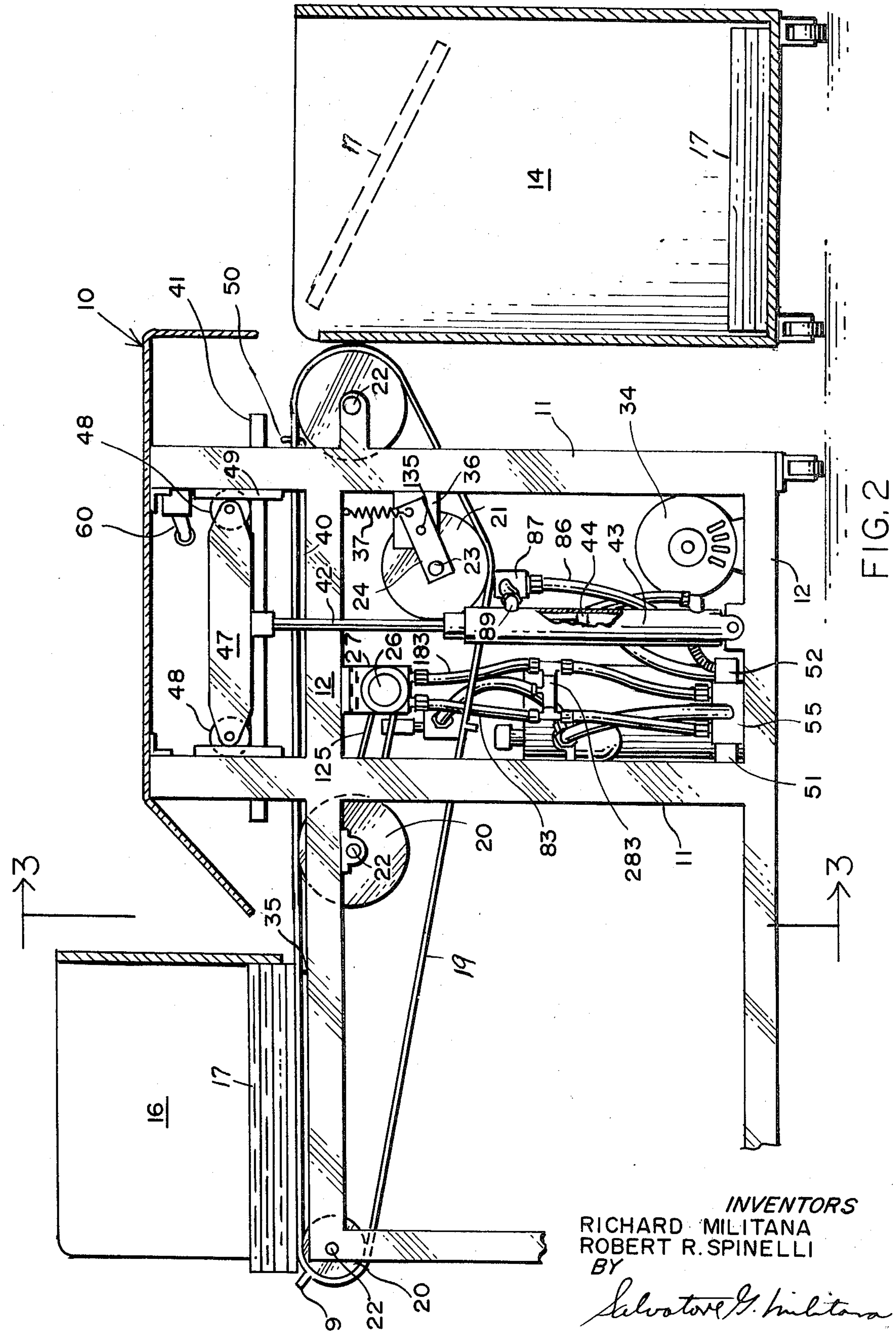
FIG. 2 is a side elevational view and shown with the side panels removed.
Figure 5:
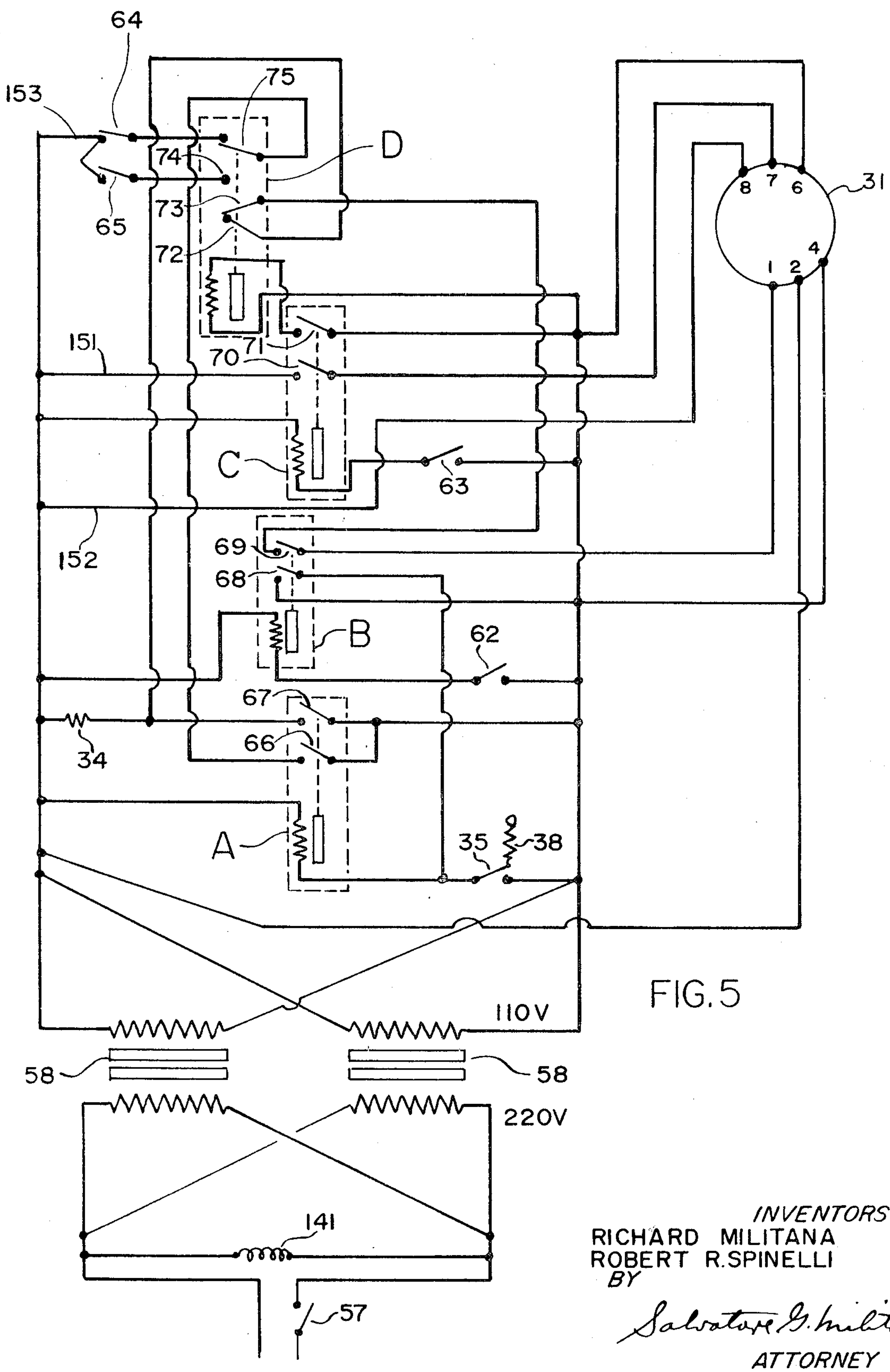
FIG. 5 is a schematic diagram of the electrical operating system.

Referring to the drawings wherein like numerals are used to designate similar parts throughout the several views, the numeral 10 refers to an apparatus constructed in accordance with our invention consisting of a vertically disposed frame of channel members 11 joined by horizontal channel members 12 and 13 on the sides and front and rear, respectively, over which panelling is positioned. The apparatus 10 is supported on casters for the convenience of being able to move the machine 10 to any part of a plant where it is best suited.

Mounted on the side of the machine 10 is a switch panel 15 and in front of the machine there is mounted a feeder bin 16 in which is a stack of cloth receiving panels 17, 17 which are hinged at one edge as at 18. Fabrics that are to be bonded to resin coated stiffening material for collars, cuffs, shoulder portions of suits and the like are placed between the panels 17, 17, the latter being placed in a vertical tier one upon the other in the feeder bin 16 and automatically fed into apparatus 10 as is explained in detail hereinafter. The panels 17, 17 are then subjected to temperatures of approximately 150° F. to 550° F., and 2 to 12 pounds per square inch of pressure and upon an expiration of an appropriate period of time measured in seconds, the panels 17, 17 are slid outwardly at the rear of the machine 10, where they are deposited in a collection bin 14 and replaced by other panels 17, 17 that have been previously loaded with fabrics to be bonded and placed in the feeder bin 16. By this system a maximum amount of bonded fabrics will be accomplished in the course of a working day. The lowermost panels 17, 17 in the stack of panels positioned in the feeder bin 16 are engaged by a block member 9 mounted on each of endless belts 19 and carried by the endless belts 19 into the machine 10. After the fabrics therein have been subjected to certain temperature pressure, the belts 19 continue carrying the panels 17, 17 to the rear of the machine 10 where they are deposited in the collection bin 14 as aforementioned; the endless belts 19 continuing their movement as the block members 9 are carried to the front of the apparatus 10 to pick up the next set of panels 17, 17 which are now lowermost in the stack within the feeder bin 16. The cycle of operation continues until all of the panels 17, 17 in the feeder bin 16 have been processed by our machine 10 and deposited in the collection bin 14.

The endless belts 19 extend longitudinally of the machine 10 on each side adjacent to the vertical channel members 11, extending about three sets of pulleys 20 and a tension pulley 21. The pulleys 20 are mounted on shafts 22 that extend transversely of the machine 10 and are journalled as at 25 to the vertical structural members 11. The tension pulleys 21 are rotatably mounted on stub shafts 23 which are rotatably mounted on one end of lever 24 that are pivoted as at 135 to a support plate 36. At the other end of the levers 24 there is a coil spring 37 secured to the horizontal frame member 12 yieldingly forcing the tension pulley 21 into engagement with the endless belts 19.

The endless belts 19 are driven by a fluid operated turbine 26 supported on a plate 27 that is bolted to the horizontal frame 13. The turbine 26 is provided with a shaft 28 on which a pulley 29 is mounted. In alignment with the pulley 29 is a further pulley 30 mounted on the shaft 22 with an endless belt 125 engaging the pulleys 29 and 30 so that upon actuation of the hydraulic turbine 26 the shafts 22 and their pulleys 20 and tension pulley 21 along with the endless belts 19 will rotate to slide the trays 17, 17 from the feeder bin 16 into the press portion of the apparatus 10 and out thereof at the rear.

Switch 35 which upon manually actuating switch 57 commences the operation of the hydraulic turbine 26 to operate the endless belts 19 that slide the trays 17, 17 into the apparatus 10 is actuated by the presence of trays 17, 17 in the feeder bin 16. The lowermost trays 17, 17 rest on the switch 35 to close the switch 35 which is spring biased as by spring 38 to yieldingly swing the switch 35 to its open position when there are no trays in the feeder bin 16 resting on the switch 35. When switch 35 has been closed, relay A is energized and normally opened switches 66 and 67 are closed through normally closed switches 75 and 64. The motor 34 of the hydraulic system is energized upon the closing of switch 67 thereby rotating motor shaft 134 on which a fluid pump 33 is mounted. The suction portion of the pump 33 is connected by a fluid duct 79 which extends to a fluid reservoir 80. The discharge end of the pump 33 is connected by a fluid duct 81 to a valve housing 56 in which are contained up and down valves 51 and 52 respectively that control the vertical movement of a press plate 41. Since the valves 51 and 52 are closed at the initial operation of the apparatus 10, the fluid will leave the valve housing by way of fluid duct 82 to valve housing 55 in which valve 53 is mounted therein. The closing of switch 66 through normally closed switches 75 and 64 causes the valve 53 to open and permits fluid to flow through fluid duct 83 to operate the turbine 26. The endless belts 19 now rotate to carry the bottom most trays 17, 17 in the feeder bin 16 into the press portion of the apparatus 10. The fluid leaving the turbine 26 flows through fluid duct 183 back to the valve housing 55 where the fluid is discharged through duct 84 to a branch duct 184 that extends to a pressure relief valve 99. The duct 84 is connected to a filter 85 which in turn is connected to pipe 185 that extends to the reservoir 80 whereby the fluid that operated the turbine 26 is returned to the reservoir 80. The fluid duct 83 and 183 are connected together by a pressure by-pass duct 283 that permits any excess pressure in the duct 83 to by-pass the turbine 26 and be discharged directly into the outlet duct 183.

As the turbine 26 is operated by the flow of fluid thereto, the endless belts 19 are rotated to carry the trays 17, 17 to the middle portion of the apparatus 10. At the rear of the machine on the path of the moving trays 17, 17 is a lever arm 50 which actuates switches 62 and 64. Normally the switch 62 is open while the switch 64 is closed so that upon tripping the arm 50 by the trays 17, 17, the switch 62 is made to close while the switch 64 opens. When the switch 64 opens, the valve 53 that directs the flow of fluid in the hydraulic system to the turbine 26 is closed thereby stopping the movement of the endless belts 19 with the trays 17, 17 resting immediately above a press plate 40 that is mounted between the endless belts 19 in coplanar relation therewith. Mounted above the stationary bed plate 40 is a companion press plate 41 supported on each side by piston rods 42 that extend downwardly into cylinders 43 that are secured at their lower ends to the horizontal frame members 12. Heating elements 141 are mounted on the press plate 41 to provide the apparatus 10 with the heat required to effect the bonding of the fabrics as aforementioned.

The piston rods 42 are each provided with a piston 44 slidably mounted in the cylinders 43 having fluid conduits 45 and 46 communicating with the upper and lower ends respectively of the cylinders 43. When fluid directed by the pump 33 enters the cylinders 43 through the conduits 88, 89 the press plate 41 will slide downwardly and when the fluid is pumped into the cylinders 43 through the conduits 90, 91 the press plate 41 will slide upwardly. In order to guide and assist in the smooth sliding movement of the press plate 41, there is provided side members 47 that extend between the vertical frame members 11. Rollers 48 mounted in the ends of the side members 47 engage and roll along vertical plates 49 mounted on the frame members 11. A layer of resilient material 32 is positioned on the press bed plate 40.

At the same time the endless belts 19 are arrested upon the opening of switch 64, the downward movement of the press plate 41 is begun by the closing of switch 62 which in turn energizes relay B closing switches 68 and 69.

With the press plate 41 at its uppermost position, switch arm 60 is actuated while upon the downward sliding movement of the press plate 41, the switch arm 60 is released. The switch arm 60 is connected to normally closed switch 65 and normally open switch 63, so that when the press plate 41 engages the switch arm 60, when the press plate 41 reaches its topmost position, the switch 65 is closed and the switch 63 is opened. Now when the press plate 41 starts sliding downwardly switch 65 is opened to prevent any movement of the belts 19 and switch 63 is closed energizing relays C and D to close switch 70 that readies the operation of the up valve 51. The enerizing of relay D opens switches 73 and 75 and closes switches 74 and 72 thereby overriding switch 64.

The closing of switch 68 maintains relay A in an energized position while closing switch 69 commences the operation of the timer 31 wherein contacts 6 and 8 become connected. The latter opens the down valve 52 in the valve housing 56 to cause the fluid in the hydraulic system to flow through the fluid duct 87, into the duct branches 88 and 89 and into the upper portion of the cylinders 43. The piston 44 is forced to slide downwardly carrying the upper press plate 41 until the plate 41 engages the trays 17, 17 and subjects the fabrics in the trays 17, 17 to the desired pressure and the heat generated by the heating elements 141 in the press plate 41.

Upon the passing of a certain period of time contacts 6 and 8 of the timer 31 are disconnected and contacts 6 and 7 are connected. Now, down valve 52 is closed while the up valve 51 is simultaneously opened to permit the flow of fluid in the hydraulic system to flow through the duct 93 and into the ducts 90, 91 forcing the pistons 44 and rods 42 and press plate 41 upwardly.

When the press plate 41 has reached its uppermost position, switch arm 60 is actuated to open switch 63 and close switch 65. The opening of switch 63 deenergizes relay C which in turn opens switch 70 that returns the up valve 51 to its closed position thereby stopping the upward movement of the press plate 41. The deenergizing of relay C also opens switch 71 which in turn opens the circuit to relay D which is in parallel with switch 72, keeping the relay B energized until relay A is deenergized.

The closing of switch 65 by the actuation of the switch arm 60 when the press plate 41 is at its uppermost position causes valve 53 to open, which in turn commences operation of the turbine 26 and movement of the endless belts 19, 19 and carrying the trays 17, 17 to the rear of the apparatus 10.

At this time the trays 17, 17 engage the switch arm 50 which opens switch 62 and closes switch 64. The opening of switch 62 deenergizes relay B which in turn opens switches 68 and 69 to deenergize relay A and breaks the circuit to the timer 31 respectively. The deenergized relay A causes relay B to be deenergized. If there are trays 17, 17 in the feeder bin 16, the switch 35 will remain in a closed position and the cycle of operation explained hereinabove will continue.

When the last trays 17, 17 have been deposited in the collection bin 14, the lack of trays 17, 17 in feeder bin 16 will cause the switch 35 to open and the operation of the apparatus ceases. However, so long as the manual switch 57 is closed, the heating elements 141 and transformers 58 are energized with the apparatus 10 ready to operate upon the closing of the switch 35 by stacking trays 17, 17 in the feeder bin 16.

It is readily noted from the above description taken in connection with the drawings, our fabric fusing press 10 operates automatically so long as trays 17, 17 are present in the feeder bin 16 to maintain the switch 35 in a closed position. The apparatus 10 will feed the trays 17, 17 by the conveyor belts 19 to the mid portion of the apparatus 10 where the fabrics in the trays 17, 17 are subjected to certain desired heat and pressure in fusing the fabrics together after which the trays 17, 17 are carried to the rear of the machine 10 and deposited in the collection bin 14. When the feeder bin 16 has been depleted of trays 17, 17, the machine 10 ceases operation.

What we claim as new and desire to secure by Letters Patent of the United States is:

1. An automatic fusing press for fabrics comprising a support structure, endless belt conveying means mounted on said support structure and extending along substantially the length thereof, a feeding bin mounted at one end of said support structure for receiving a plurality of fabric containing trays thereon, means feeding each of said trays to said endless belt means, actuating means operating said endless belt means, collection means mounted at the other end of said support structure for receiving said trays and power actuated press means mounted substantially intermediate said ends of said support means, said press means having heating means, and timer means operating said press means and simultaneously stopping said endless belt operating means upon said trays arriving at said press means whereby said trays are subjected to a designated pressure and temperature for a predetermined period of time and further means operating said endless belt means upon the stopping of said press means whereby said trays are discharged from said endless belt means into said collection means at said other end of said support means.

2. The structure as recited by claim 1 taken in combination with switch means mounted at each end of said support structure operatively connected to said endless belt means whereby upon the emptying of said feed bin of said trays and discharging said trays into said tray collection means said endless belt means are stopped.

3. The structure as recited by claim 2 taken in combination with turbine means operatively connected to said endless belt means, a fluid reservoir, a motor operated pump, and duct means connecting said fluid reservoir, said pump and said turbine means whereby upon actuation of said actuating means, said pump directs the flow of fluid from said reservoir to said turbine to operate said endless belts.

References Cited

UNITED STATES PATENTS

| | | | |
|---|---|---|---|
| 2,318,695 | 5/1943 | Klammt et al. | 156—558 |
| 3,137,874 | 6/1964 | Hildmann et al. | 156—583X |
| 3,323,446 | 6/1967 | Alpini | 156—583X |

BENJAMIN A. BORCHELT, Primary Examiner

J. J. DEVITT, Assistant Examiner

U.S. Cl. X.R.

100—51, 93(P), 222; 156—583